United States Patent
Sasaoka et al.

(10) Patent No.: US 8,346,041 B2
(45) Date of Patent: *Jan. 1, 2013

(54) OPTICAL COMMUNICATIONS SYSTEM

(75) Inventors: Eisuke Sasaoka, Yokohama (JP); Kazuya Kuwahara, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/371,835

(22) Filed: Feb. 13, 2012

(65) Prior Publication Data

US 2012/0148258 A1  Jun. 14, 2012

Related U.S. Application Data

(63) Continuation of application No. 12/850,669, filed on Aug. 5, 2010, now Pat. No. 8,145,024.

(30) Foreign Application Priority Data

Aug. 6, 2009 (JP) ................... P2009-183666

(51) Int. Cl.
*G02B 6/00* (2006.01)
*H04B 10/12* (2006.01)

(52) U.S. Cl. ........ 385/122; 385/123; 385/124; 385/125; 385/126; 385/127; 385/128; 398/142; 398/183; 398/200

(58) Field of Classification Search .......... 385/122–128; 398/183, 200, 142
See application file for complete search history.

(56) References Cited

U.S. PATENT DOCUMENTS

| | | | |
|---|---|---|---|
| 6,449,415 B1 * | 9/2002 | Sasaoka | 385/123 |
| 7,095,932 B2 * | 8/2006 | Sillard et al. | 385/126 |
| 7,292,757 B2 * | 11/2007 | Rossi | 385/100 |
| 7,519,255 B2 * | 4/2009 | Kumano et al. | 385/123 |
| 2005/0259932 A1 * | 11/2005 | Nagayama et al. | 385/123 |
| 2007/0009218 A1 * | 1/2007 | Kumano | 385/123 |
| 2008/0279515 A1 | 11/2008 | Bickham et al. | |

(Continued)

FOREIGN PATENT DOCUMENTS

JP  2001-255564  9/2001

(Continued)

OTHER PUBLICATIONS

Nagayama et al., Ultra Low Loss (0.1484 dB/km) Pure Silicxa Fiber, SEI Technical Review, No. 57, Jan. 2004, p. 3-4.*

(Continued)

*Primary Examiner* — Brian M. Healy
*Assistant Examiner* — Guy Anderson
(74) *Attorney, Agent, or Firm* — Drinker Biddle & Reath LLP

(57) ABSTRACT

The present invention relates to an optical communications system that allows improving OSNR while suppressing the power increase of pumping light for distributed Raman amplification. In the optical communications system, an optical fiber is laid in a transmission section between a transmitter station (or repeater station) and a receiver station (or repeater station), and optical signals are transmitted from the transmitter station to the receiver station via the optical fiber. In the optical communications system, pumping light for Raman amplification, outputted by a pumping light source provided in the receiver station, is fed into the optical fiber via an optical coupler, and the optical signals are distributed-Raman-amplified in the optical fiber. The transmission loss and the effective area of the optical fiber satisfy, at the wavelength of 1550 nm, a predetermined relationship.

7 Claims, 6 Drawing Sheets

U.S. PATENT DOCUMENTS

| | | | |
|---|---|---|---|
| 2008/0285929 A1* | 11/2008 | Shimotakahara | 385/127 |
| 2008/0292257 A1* | 11/2008 | Kumano et al. | 385/127 |
| 2009/0232463 A1* | 9/2009 | Gibson et al. | 385/127 |
| 2011/0044700 A1* | 2/2011 | Sasaoka et al. | 398/183 |

FOREIGN PATENT DOCUMENTS

| | | |
|---|---|---|
| JP | 2002-072263 | 3/2002 |
| JP | 2002-299738 | 10/2002 |
| JP | 2003-066261 | 3/2003 |
| JP | 2004-341525 | 12/2004 |
| JP | 2008-020743 | 1/2008 |
| WO | WO 00/62106 | 10/2000 |

OTHER PUBLICATIONS

G. Charlet et al., "Transmission of 81 channels at 40Gbit/s over a Transpacific-Distance Erbium-only Link, using PDM-BPSK Modulation, Coherent Detection, and a new large effective area fibre," ECOC Th.3.E.3, Sep. 21-25, 2008, vol. 7-29 and 7-30.

K. Nakayama et al, "Ultra-low-loss (0.1484 dB/km) pure silica core fibre and extension of transmission distance," Electronics Letters, Sep. 26, 2002, vol. 38, No. 20.

Corning® SMF-$_2$8® ULL Optical Fiber with Corning® Ultra-Low Loss Technology Product Information, Corning catalog, Corning Incorporated, Aug. 2008.

Jianjun Yu et al., "17 Tb/s (161×114 Gb/s) PolMux-RZ-8PSK transmission over 662 km of ultra-low loss fiber using C-band EDFA amplification and digital coherent detection," ECOC 2008, Sep. 21-25, 2008, vol. 7-27 and 7-28.

Takashi Mizuochi, "Forward Error Correction for Approaching Shannon Limit in Optical Communications," IEICE BCI-1-12, Sep. 16, 2008, SS-75 and SS-76, including partial English translation.

Notice of Allowance mailed Nov. 18, 2011 in prior parent U.S. Appl. No. 12/850,669.

* cited by examiner

OPTICAL COMMUNICATIONS SYSTEM

This is a continuation application of prior application Ser. No. 12/850,669, filed on Aug. 5, 2010 now U.S. Pat. No. 8,145,024, which is incorporated by reference herein in its entirety.

BACKGROUND OF THE INVENTION

1. Field of the Invention

The present invention relates to an optical communications system in which optical signals are transmitted via an optical fiber laid in a transmission section.

2. Related Background of the Invention

In order to reduce the number of repeater stations by elongating each transmission section and to transmit large volumes of information, optical SN ratio (OSNR) is preferably large, in optical communications systems in which optical signals are transmitted via an optical fiber laid in a transmission section. In order to increase OSNR, transmission loss in the optical fiber are preferably small, and the effective area of the optical fiber is preferably large.

Jianjun Yu, et al., ECOC 2008, Th3.E2 (Document 1) disclose results of a transmission experiment that achieved a total transmission capacity of 17 Tbps with 114 Gbps×161 wavelengths by 8PSK modulation, using an optical fiber SMF-28ULL (by Corning) 662 km long and having an average loss of 0.169 dB/km at a wavelength of 1550 nm.

The Corning optical fiber SMF-28ULL catalogue (ver. August 2008) (Document 2) indicates that the central value of the mode field diameter of the Corning optical fiber SMF-28ULL is 10.7 μm at the wavelength of 1550 nm. The effective area of the optical fiber SMF-28ULL is 90 μm², assuming a Gaussian field distribution.

G. Charlet, et al., ECOC 2008, Th3.E3 (Document 3) disclose results of a transmission experiment in which there was realized a total transmission capacity of 3.2 Tbps with 40 Gbps×81 wavelengths by BPSK modulation, over a transmission distance of 11520 km, with 18 recirculations in a fiber loop 640 km long, using an optical fiber having a loss of 0.184 dB/km and an effective area of 120 μm².

K. Nagayama, et al., Electronics Letters, 26 Sep. 2002, Vol. 38, No. 20 (Document 4) disclose an optical fiber having, at the wavelength of 1550 nm, a transmission loss of 0.15 dB/km and an effective area of 118 μm².

U.S. Patent Application aid-Open No. 2008/0279515 (Document 5) discloses an optical fiber having, at the wavelength of 1550 nm, a transmission loss of 0.16 dB/km and an effective area of 208 μm².

In optical communications systems, optical signals are amplified by way of optical amplifiers, in order to compensate the optical signal loss incurred during the optical signals propagate through the optical fiber that is laid in transmission sections. From the viewpoint of the noise figure (NF) of the optical amplifier, the optical signals in an optical fiber laid in a transmission section are preferably distributed-Raman-amplified.

SUMMARY OF THE INVENTION

The present inventors have examined conventional optical communications systems, and as a result, have discovered the following problems. That is, in conventional optical communications systems, specifically, increasing the effective area of an optical fiber used in a transmission medium allows ordinarily increasing the input power into the optical fiber. While doing so contributes to improving OSNR, it also entails the power increasing of the pumping light for distributed Raman amplification, which is problematic.

The present invention has been developed to eliminate the problems described above. It is an object of the present invention to provide an optical communications system that allows improving OSNR while suppressing the power increase of pumping light for distributed-Raman amplification.

The optical communications system according to the present invention comprises a transmitter station, one or more repeater stations, a receiver station, and an optical fiber laid in transmission sections positioned between the transmitter station (or repeater station) and the receiver station (or repeater station). In particular, the optical fiber laid in any transmission section at least between the transmitter station and the receiver station, between the transmitter station and a repeater station, between repeater stations, or between a repeater station and the receiver station, transmits optical signals, and the optical signals are distributed-Raman-amplified. In particular, a transmission loss α (dB/km) and an effective area $A_{\mathit{eff}}$ (μm²) of the optical fiber satisfy, at a wavelength of 1550 nm, the following relationship equations (1a) to (1c):

$$\alpha \approx -0.001 \cdot A_{\mathit{eff}} + 0.27 \qquad (1a)$$

$$0.13 \leq \alpha \leq 0.15 \qquad (1b)$$

$$A_{\mathit{eff}} \geq 120 \qquad (1c)$$

In the optical communications system according to the present invention, the optical fiber preferably include, as a first configuration, a central core extending along a predetermined axis, and a cladding surrounding the central core and having a refractive index lower than that of the central core. In the first configuration, the central core of the optical fiber is preferably comprised of pure silica glass, or silica glass obtained by doping pure silica glass with at least one of $P_2O_5$ of 1 mol % or more but 10 mol % or less, Cl of less than 2000 mol ppm, F of 2000 mol ppm or more but 10000 mol ppm or less, and $A_2O$ (where A is an alkali metal element) of 1 mol ppm or more but 10000 mol ppm or less. The pure silica glass contains Cl of 2000 mol ppm or more but 20000 mol ppm or less that is incorporated in the dehydration process during a fiber fabrication. Suitable alkali metal elements in the $A_2O$ are Na, K, Rb and Cs.

In the optical communications system according to the present invention, the optical fiber may include, as a second configuration, a central core having the above-described structure, a first cladding surrounding the outer periphery of the central core, a second cladding surrounding an outer periphery of the first cladding, and a third cladding surrounding an outer periphery of the second cladding. Regarding refractive indices of the central core and the first to third cladding, it is preferable that the refractive index of the central core is highest and the refractive index of the second cladding is lowest. The second cladding of the optical fiber is preferably comprised of silica glass doped with F element whose amount is more than a doping amount of F element in each of the first cladding and the third cladding (when there is no doping of F element, the doping amount of F element includes 0), or silica glass in which a plurality of voids extending in a fiber axial direction (optical axis direction).

The optical communications system of the present invention has preferably a structure in which optical signals are transmitted in accordance with a multilevel modulation scheme of four or more levels (for instance, QPSK or 16-QAM).

DESCRIPTION OF THE PREFERRED EMBODIMENTS

Figure 1:
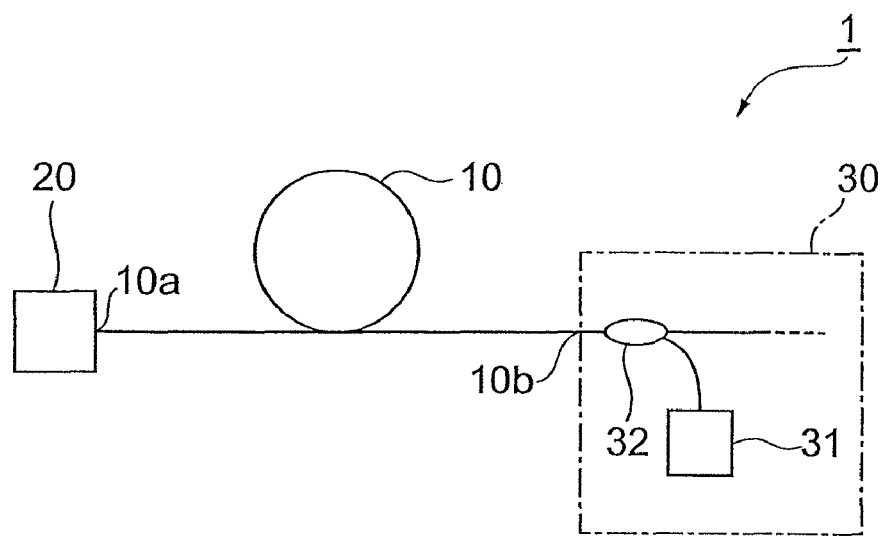
FIG. 1 is a view showing the configuration of an embodiment of an optical communications system according to the present invention.

In the following, embodiments of an optical communications system according to the present invention will be explained in detail with reference to FIGS. 1 to 3, 4A to 5B and 6. In the description of the drawings, identical or corresponding components are designated by the same reference numerals, and overlapping description is omitted.

FIG. 1 is a view showing the configuration of an optical communications system 1 according to the present embodiment. The optical communications system 1 according to the present embodiment comprises a transmitter station, one or more repeater stations, a receiver station, and an optical fiber 10 serving as a transmission medium, namely an optical fiber laid in the transmission section that is positioned between the transmitter station (or repeater station) and the receiver station (or repeater station). Particularly, as shown in FIG. 1, one end 10a of the optical fiber 10 is optically connected to the transmitter station (or repeater station) 20, while the other end 10b is optically connected to the receiver station (or repeater station) 30. Thereby, the optical fiber 10 is laid in the transmission section between the transmitter station (or repeater station) 20 and the receiver station (or repeater station) 30. The optical signals are transmitted from the transmitter station (or repeater stations) 20 to the receiver station (or repeater stations) 30 via the optical fiber 10. In the optical communications system 1, pumping light for Raman amplification, outputted by a pumping light source 31 provided in the receiver station (or repeater station) 30, is supplied to the optical fiber 10 via an optical coupler 32. In such a configuration, the optical signals are distributed-Raman-amplified in the optical fiber 10. The optical communications system 1 includes a structure wherein optical signals are transmitted in accordance with a multilevel modulation scheme of four or more levels. For example, in the present embodiment, the transmitter station 20 transmits optical signals to the optical fiber 10 with a multilevel modulation scheme such as QPSK and 16-QAM.

In such an optical communications system 1, an optical fiber having various characteristics is ordinarily used as the optical fiber 10 that is laid in the transmission section. Besides the optical fibers disclosed in Documents 1 to 5, a dispersion-shifted optical fiber which has, at the wavelength of 1550 nm, a transmission loss of 0.20 dB/km and an effective area of 50 µm², a single mode optical fiber which has, at the wavelength of 1550 nm, a transmission loss of 0.19 dB/km and an effective area of 80 µm², or a pure silica central core optical fiber which has, at the wavelength of 1550 nm, a transmission loss of 0.16 dB/km and an effective area of 110 µm², may be used as the optical fiber 10. In the explanation below, the above-described dispersion-shifted optical fiber will be used in Comparative example A, the above-described single mode optical fiber in Comparative example B, and the above-described pure silica central core optical fiber in Comparative example C.

Figure 2:
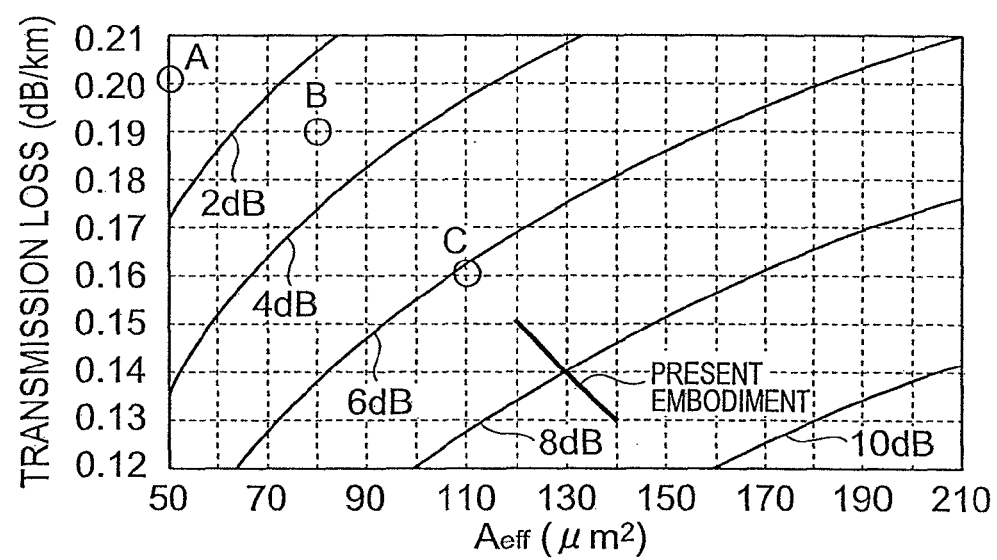
FIG. 2 is a graph showing a relationship at a wavelength of 1550 nm between transmission loss, effective area and OSNR of optical fibers.

FIG. 2 is a graph showing the relationship at the wavelength of 1550 nm between transmission loss, effective area and OSNR of optical fibers. The graph shows contour lines of the distribution of the OSNR improvement amount on a plane defined by setting, at the wavelength of 1550 nm, the transmission loss (dB/km) to the ordinate and the effective area $A_{\mathit{eff}}(\mu m^2)$ to the abscissa. The OSNR improvement amount denotes the improvement amount of OSNR, based on the transmission loss reduction and the phase shift reduction of self-phase modulation in a transmission section 80 km long, while taking as a reference the OSNR of the optical fiber according to Comparative example A.

Figure 3:
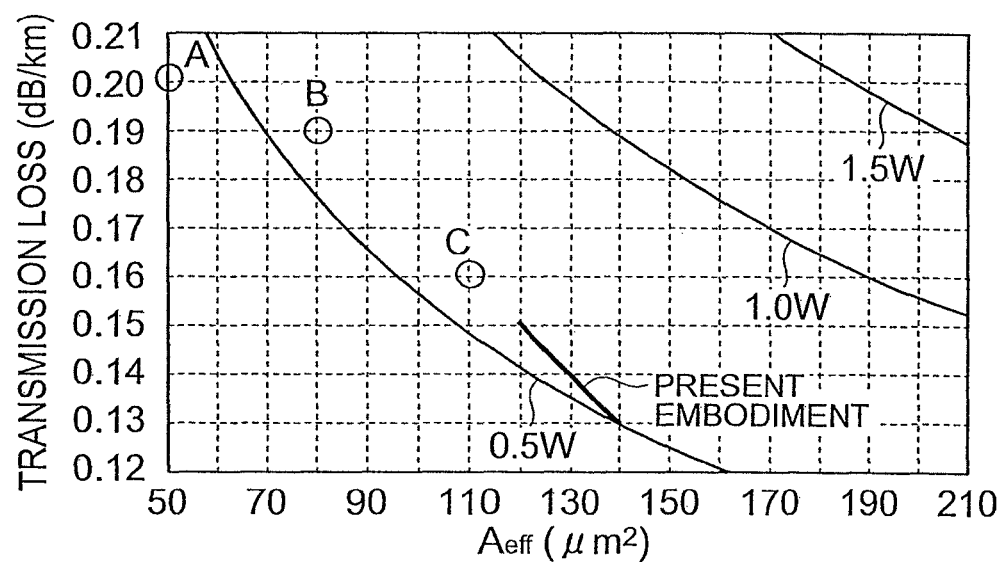
FIG. 3 is a graph showing a relationship at the wavelength of 1550 nm between transmission loss, effective area and power of pumping light for Raman amplification of optical fibers.

FIG. 3 is a graph showing the relationship at the wavelength of 1550 nm between transmission loss, effective area and power of pumping light for Raman amplification of optical fibers. The graph shows, by using contour lines, the power distribution of the pumping light for Raman amplification on a plane defined by setting, at the wavelength of 1550 nm, the transmission loss (dB/km) to the ordinate and the effective area $A_{\mathit{eff}}(\mu m^2)$ to the abscissa. The power of the pumping light for Raman amplification denotes the power of the pumping light at a wavelength of 1450 nm as required for obtaining a Raman amplification gain that just balances out the transmission loss at the wavelength of 1550 nm, in a transmission section 80 km long.

In FIGS. 2 and 3, the positions of the optical fibers according to Comparative examples A to C are shown, and the range of the optical fiber 10 that is used in the optical communications system 1 according to the present embodiment is also indicated. The transmission loss α (dB/km) and the effective area $A_{\mathit{eff}}(\mu m^2)$ of the optical fiber 10 according to the present embodiment satisfy, at the wavelength of 1550 nm, the following relationships (2a) to (2c):

$$\alpha \approx -0.001 \cdot A_{\mathit{eff}} + 0.27 \quad (2a)$$

$$0.13 \leq \alpha \leq 0.15 \quad (2b)$$

$$A_{\mathit{eff}} \geq 120 \quad (2c)$$

In the optical communications system 1 wherein such an optical fiber 10 is laid in transmission sections, the OSNR can be improved (see FIG. 2) while suppressing the power increase of the pumping light for distributed Raman amplification (see FIG. 3), as compared with cases in which the optical fibers of Comparative example A to C are used. Examples of such an optical fiber 10 are explained next.

Figure 4A:
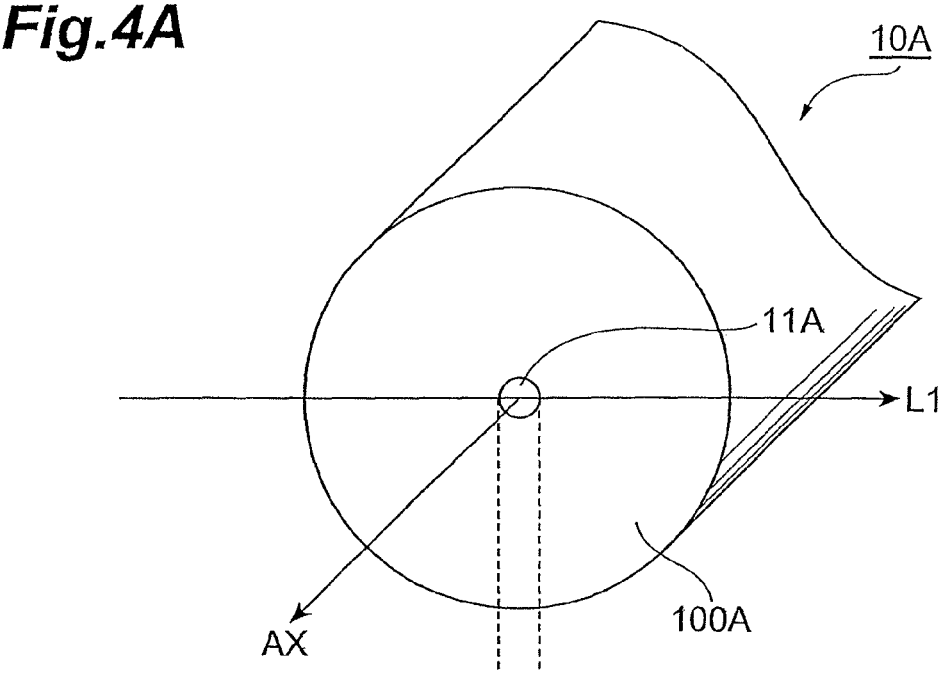
FIG. 4A shows a cross-sectional structure of an optical fiber according to a first example that can be applied to the optical communications system according to the present embodiment, and FIG. 4B shoes a refractive index profile thereof.
Figure 4B:
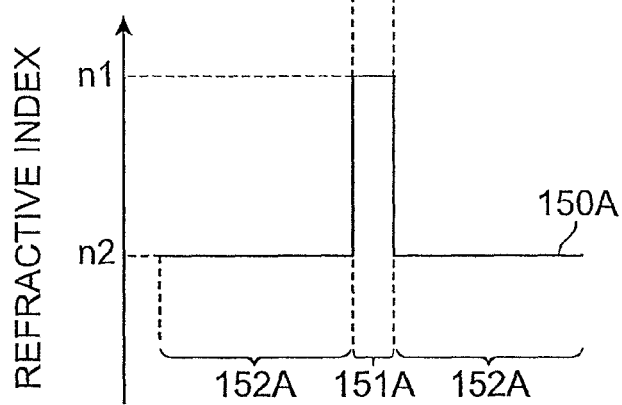

FIGS. 4A and 4B show the cross-sectional structure of an optical fiber according to a first example that can be used in the optical communications system according to the present embodiment, and the refractive index profile thereof. As shown in FIG. 4A, the optical fiber 10A of the first example comprises a central core 11A which has a refractive index $n_1$ and extends along a predetermined axis (optical axis AX), and a cladding 100A which has a refractive index $n_2$ ($<n_1$) and surrounds the outer periphery of the central core 11A. FIG. 4B is a refractive index profile 150A of the optical fiber 10A, along the line L1 (line orthogonal to the optical axis AX) in FIG. 4A. In the refractive index profile 150A, a region 151A denotes a refractive index of the central core 11A along the line L1, and a region 152A denotes the refractive index of cladding 110A along the line L1.

The structural parameters of the optical fiber of the first example are selected so as to achieve optical characteristics that satisfy the above relationship equations (2a) to (2c). As described above, the optical fiber 10A of the first example comprises, for instance, the central core 11A, and the cladding 100A which surrounds the outer periphery of the central core 11A and which has a refractive index $n_2$ lower than the refractive index $n_1$ of the central core 11A, and has, at the wavelength of 1550 nm, a transmission loss of 0.15 dB/km and an effective area of 120 μm². As an example of structural parameter, the relative refractive index difference of the central core 11A with respect to the cladding 100A is 0.26%, and the diameter of the central core 11A is 10.8 μm. The fictive temperature of the central core 11A is 1300° C. The fictive temperature can be realized by controlling the cooling rate during drawing and promoting the relaxation of the glass structure of the central core 11A.

As shown in FIG. 2, the OSNR improvement amounts of the optical fiber disclosed in Document 1 (average loss: 0.169 dB/km, effective area: 90 μm² based on the disclosure of Document 2) and of the optical fiber disclosed in Document 3 (loss: 0.184 dB/km, effective area: 120 μm²) are just under 5 dB. The OSNR improvement amount in the optical fiber of the first example, by contrast, is of about 7 dB, i.e. an OSNR improvement amount of 2 dB or more can be realized. The OSNR at the wavelength of 1550 nm in a receiver terminal in multi-stage optical amplification/repeating systems is expressed by equation (3) below. As can be seen from the equation (3), the OSNR improvement of 2 dB allows elongating the transmission distance about 1.6-fold. In the equation, $P_{in}$ denotes the optical power per wavelength channel to be inputted into the optical fiber, NF denotes the noise figure of the optical amplifier, $L_{sp}$ denotes the loss of the transmission section, and $N_{amp}$ denotes the number of optical amplifiers (=the number of relay sections−1).

$$OSNR = 58 + P_{in} - NF - L_{sp} - 10 \cdot \log N_{amp} \qquad (3)$$

System performance in optical communications systems based on optical amplification/repeating can be improved by using distributed Raman amplification. As can be seen from FIG. 3, the power of the pumping light for Raman amplification of the optical fiber (loss: 0.184 dB/km, effective area: 120 μm²) disclosed in Document 3 must be about 1.5 times that of a standard single mode optical fiber (optical fiber of Comparative example B). In contrast thereto, the power of the pumping light for Raman amplification of the optical fiber 10A of the first example can be about the same as that of the optical fiber of Comparative example B.

A first configuration of an optical fiber of a second example comprises a central core having a cross-sectional structure and a refractive index profile identical to those of the optical fiber 10A of the above-described first example (see FIGS. 4A and 4B), and a cladding surrounding the central core and having a lower refractive index than that of the central core. The optical fiber of the second example has, at the wavelength of 1550 nm, a transmission loss of 0.13 dB/km and an effective area of 140 μm². The central core (first configuration) of the optical fiber of the second example is preferably comprised of pure silica glass, or silica glass obtained by doping pure silica glass with at least one of $P_2O_5$ of 1 mol % or more but 10 mol % or less, Cl of less than 2000 mol ppm, F of 2000 mol ppm or more but 10000 mol ppm or less, and $A_2O$ (where A is an alkali metal element) of 1 mol ppm or more but 10000 mol ppm or less. The pure silica glass contains Cl of 2000 mol ppm or more but 20000 mol ppm or less that is incorporated in the dehydration process during a fiber fabrication. Suitable alkali metal elements in the $A_2O$ are Na, K, Rb and Cs.

Figure 5A:
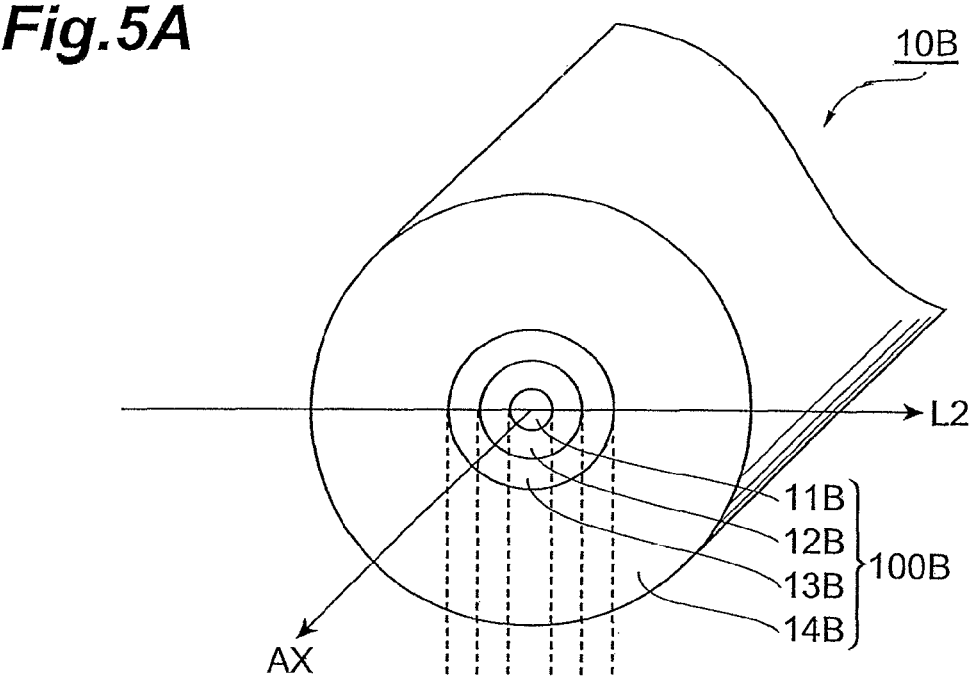
FIG. 5A shows a cross-sectional structure of an optical fiber (second configuration) according to a second example that can be applied to an optical communications system according to the present embodiment.
Figure 5B:
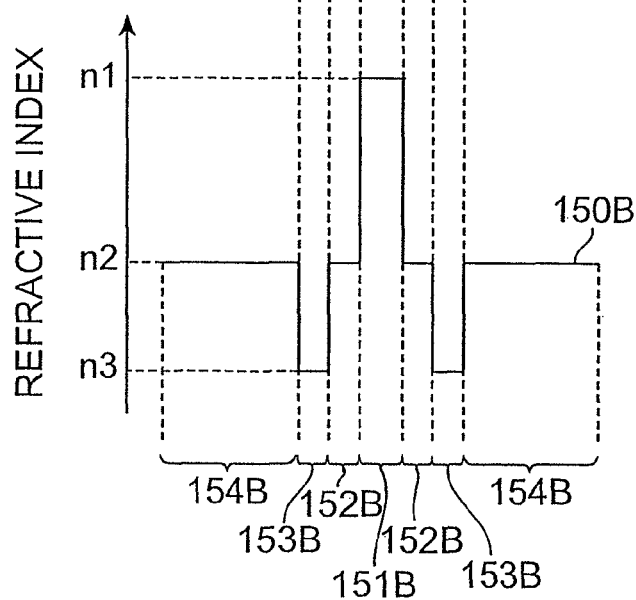
FIG. 5B shows a refractive index profile thereof.

A second configuration of the optical fiber of the second example has, for instance, a cross-sectional structure and a refractive index profile such as those shown in FIGS. 5A and 5B. Particularly, an optical fiber 10B (second configuration) of the second example has a central core 11B extending along a predetermined axis (optical axis AX) and having a refractive index $n_1$, and a cladding 100B which surrounds the outer periphery of the central core 11B, as shown in FIG. 5A. The cladding 100B comprises a first cladding 12B which surrounds the outer periphery of the central core 11B and has a refractive index $n_2$ ($<n_1$), a second cladding 13B which surrounds the outer periphery of the first cladding 12B and has a refractive index $n_3$ ($<n_2$), and a third cladding 14B which surrounds the outer periphery of the second cladding 13B and has a refractive index $n_2$ ($>n_3$). FIG. 5B is a refractive index profile 150B of the optical fiber 10B, along line the L2 (line orthogonal to the optical axis AX) in FIG. 5A. In the refractive index profile 150B, a region 151B denotes the refractive index of the central core 11B along the line L2, region 152B denotes the refractive index of the first cladding 12B along the line L2, region 153B denotes the refractive index of the second cladding 13B along line the L2, and region 154B denotes the refractive index of the third cladding 14B along the line L2.

As shown in FIGS. 5A and 5B, the refractive index $n_1$ of the central core 11B is highest, and the refractive index $n_3$ of the second cladding 13B is lowest, from among the refractive indices of the regions in the optical fiber 10B. The first to third claddings 12B to 14B are doped with F element. The second cladding 13B is comprised of silica glass doped with F element whose amount is more than the doping amount of F element in each of the first cladding 12B and the third cladding 14B. Alternatively, the second cladding 13B is suitably comprised of silica glass having formed therein a plurality of voids extending in the fiber axial direction (optical axis AX) (see optical fiber 10C of a third configuration, shown in FIG. 6). The refractive indices of the first cladding 12B and the third cladding 14B are identical. With respect to the refractive index ($=n_2$) of the foregoing, the relative refractive index difference of the central core 11B is 0.22%, and the relative refractive index difference of the second cladding 13B is −0.75%. The diameter of the central core 11B is 11.9 μm. The diameter of the first cladding 12B is 20.8 μm. The diameter of the second cladding 13B is 39.0 μm. The diameter of the third cladding 14B is 125 μm.

Figure 6:
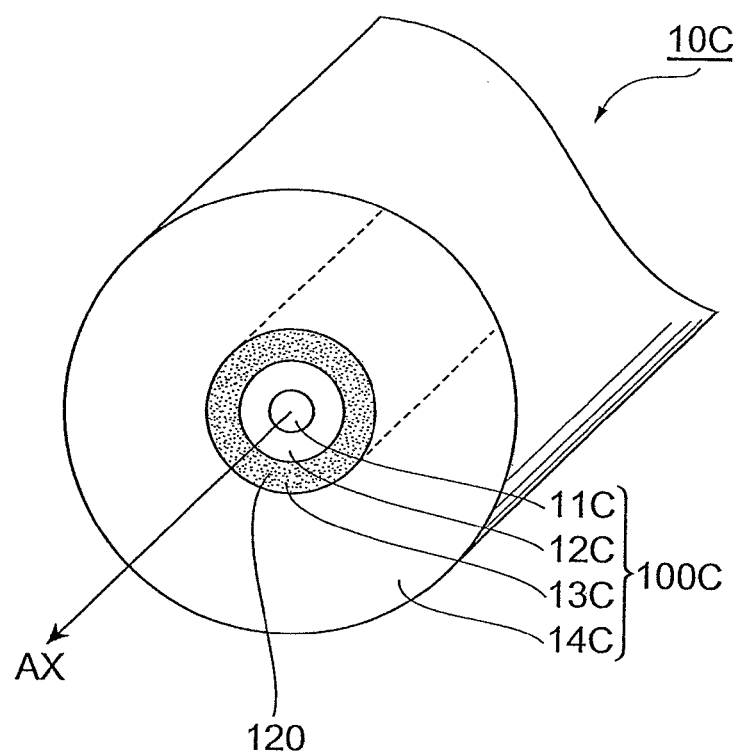
FIG. 6 is a cross-sectional view showing a third configuration of an optical fiber according to the second example.

FIG. 6 is a cross-sectional view showing the third configuration of the optical fiber of the second example. The third configuration differs from the above-described second configuration in that now the second cladding is comprised of silica glass having formed therein a plurality of voids extending in the fiber axial direction (optical axis AX). In particular, the optical fiber 10C of the third configuration comprises central core 11C extending along a predetermined axis (optical axis AX) and having a refractive index $n_1$, and a cladding 100C which surrounds the outer periphery of the central core 11C. Furthermore, the cladding 100C comprises a first cladding 12C which surrounds the outer periphery of the central core 11C and has a refractive index $n_2$ ($<n_1$), a second cladding 13C which surrounds the outer periphery of the first cladding 12C and has a refractive index $n_3$ ($<n_2$), and a third cladding 14C which surrounds the outer periphery of the second cladding 13C and has a refractive index $n_2$ ($>n_3$). In particular, the lowest refractive index ($n_3$) is realized in the second cladding 13C, from among the regions that make up the optical fiber 10C, thanks to the plurality of voids 120 formed along the optical axis AX (the optical fiber 10C has the same refractive index profile as the refractive index profile 150B shown in FIG. 5B).

A transmission loss of 0.13 dB/km can be realized in the optical fiber of the second example (first to third configurations) through lowering of the viscosity of the silica glass and by setting of the fictive temperature of the central core, in the fiber state, to about 1000 degrees. A fictive temperature of 1000 degrees in the central core can be realized by forming the central core from pure silica glass, or silica glass obtained by doping pure silica glass with at least one of $P_2O_5$ of 1 mol % or more but 10 mol % or less, Cl of less than 2000 mol ppm, F of 2000 mol ppm or more but 10000 mol ppm or less, and $A_2O$ (where A is an alkali metal element) of 1 mol ppm or more but 10000 mol ppm or less. Pure silica glass contains Cl of 2000 mol ppm to 20000 mol ppm that is incorporated in the dehydration process during a fiber fabrication. Suitable alkali metal elements in the $A_2O$ are Na, K, Rb and Cs. A fictive temperature of 1000 degrees in the central core can be realized by manufacturing an optical fiber having a central core of pure silica glass, $P_2O_5$-doped silica glass or the above-described alkali-metal-doped silica glass, while controlling the cooling rate during drawing.

Increased macrobending loss and microbending loss become a concern when the effective area is expanded to 140 $\mu m^2$. However, macrobending can be kept down at a level similar to that of standard single mode optical fibers by, for instance, providing the low-refractive index second claddings 13B, 13C, such as those shown in FIGS. 5A and 6. Microbending can be kept down at a level similar to that of standard single mode optical fibers by, for instance, improving fiber sheathing.

As can be seen from FIG. 2, the OSNR improvement amount of the optical fiber of the second example (first to third configurations) is about 9 dB, which constitutes an improvement of 4 dB or more over the optical fibers disclosed in Documents 1 and 3. As shown in FIG. 2 of Mizuochi, 2008 IEICE Society Conference, BCI-1-12 (Document 6), an OSNR improvement of 4 dB enables a transition from QPSK to 16-QAM while keeping the error rate constant. Therefore, the optical communications system 1 according to the present embodiment, in which an optical fiber of the second example is laid in a transmission section, allows realizing a transmission capacity that is double that of the optical communications systems disclosed in Documents 1 and 3. Moreover, as can be seen from FIG. 3, the power of the pumping light for Raman amplification can be kept equivalent to or lower than that of a standard single mode optical fiber.

The optical communications system according to the present invention allows improving OSNR while curbing increases in the power of the pumping light for distributed Raman amplification.

What is claimed is:

1. An optical communications system in which an optical signal is transmitted via an optical fiber that is laid in a predetermined transmission section, and the optical signal is distributed-Raman-amplified in the optical fiber, wherein a transmission loss $\alpha$ (dB/km) and an effective area $A_{eff}$ ($\mu m^2$) of the optical fiber satisfy, at the wavelength of 1550 nm, the following relationships:

$0.13 \leq \alpha \leq 0.15$ $A_{eff} \geq 120$, wherein the optical fiber comprises a central core extending along a predetermined axis, and a cladding surrounding an outer periphery of the central core and having a refractive index lower than that of the central core, and wherein the central core of the optical fiber comprises pure silica glass, or silica glass obtained by doping pure silica glass with at least one of $P_2O_5$, of 1 mol % or more but 10 mol % or less, Cl of less than 2000 mol ppm, F of 2000 mol ppm or more but 10000 mol ppm or less, and $A_2O$ (where A is an alkali metal element) of 1 mol ppm or more but 10000 mol ppm or less.

2. An optical communications system according to claim 1, wherein the cladding of the optical fiber comprises a first cladding surrounding the outer periphery of the central core, a second cladding surrounding an outer periphery of the first cladding, and a third cladding surrounding an outer periphery of the second cladding, and wherein a refractive index of the central core is highest, and a refractive index of the second cladding is lowest, from among the central core, the first cladding, the second cladding and the third cladding.

3. An optical communications system according to claim 2, wherein the second cladding of the optical fiber comprises silica glass doped with F element whose amount is more than a doping amount of F element in each of the first cladding and the third cladding, or silica glass having formed therein a plurality of voids extending in a fiber axial direction.

4. An optical communications system in which an optical signal is transmitted via an optical fiber that is laid in a predetermined transmission section, and the optical signal is distributed-Raman-amplified in the optical fiber, wherein a transmission loss $\alpha$ (dB/km) and an effective area $A_{eff}$ ($\mu m^2$) of the optical fiber satisfy, at the wavelength of 1500 nm, the following relationships:

$0.13 \leq \alpha \leq 0.15$ $A_{eff} \geq 120$, wherein the optical fiber comprises a central core extending along a predetermined axis, a first cladding surrounding an outer periphery of the central core, a second cladding surrounding an outer periphery of the first cladding, and a third cladding surrounding an outer periphery of the second cladding, and wherein a refractive index of the central core is highest, and a refractive index of the second cladding is lowest, from among the central core, the first cladding, the second cladding and the third cladding.

5. An optical communications system according to claim 4, wherein the second cladding of the optical fiber comprises silica glass doped with F element whose amount is more than a doping amount of F element in each of the first cladding and the third cladding, or silica glass having formed therein a plurality of voids extending in a fiber axial direction.

6. An optical communications system in which an optical signal is transmitted via an optical fiber that is laid in a predetermined transmission section, and the optical signal is distributed-Raman-amplified in the optical fiber, wherein a transmission loss $\alpha$ (dB/km) and an effective area $A_{eff}$ ($\mu m^2$) of the optical fiber satisfy, at the wavelength of 1550 nm, the following relationships:

$0.13 \leq \alpha \leq 0.15$ $A_{eff} \geq 120$, and wherein the optical communications system has a structure in which optical signals are outputted by multilevel modulation of four or more levels.

7. An optical communications system in which an optical signal is transmitted via an optical fiber that is laid in a predetermined transmission section, and the optical signal is distributed-Raman-amplified in the optical fiber, wherein a transmission loss $\alpha$ (dB/km) and an effective area $A_{eff}$ ($\mu m^2$) of the optical fiber satisfy, at the wavelength of 1550 nm, the following relationships:

$0.13 \leq \alpha \leq 0.15$ $A_{eff} \geq 120$, and wherein the effective area Aeff ($\mu m^2$) of the optical fiber satisfies, at the wavelength of 1550 nm, the following relationship:

$A_{eff} \leq 140$.

* * * * *